United States Patent
Wada

(10) Patent No.: US 6,715,522 B1
(45) Date of Patent: Apr. 6, 2004

(54) FRONT AND REAR TIRE COMBINATION FOR VEHICLE HAVING ABS AND VEHICLE

(75) Inventor: Yasuo Wada, Amagasaki (JP)

(73) Assignee: Sumitomo Rubber Industries, Ltd., Hyogo-Ken (JP)

( * ) Notice: Subject to any disclaimer, the term of this patent is extended or adjusted under 35 U.S.C. 154(b) by 0 days.

(21) Appl. No.: 09/442,267

(22) Filed: Nov. 18, 1999

(30) Foreign Application Priority Data

Nov. 20, 1998 (JP) .......................................... 10-331518

(51) Int. Cl.[7] .......................... B60C 11/11; B60C 11/12; B60C 107/00; B60C 119/00
(52) U.S. Cl. .................. 152/209.18; 152/901; 152/902; 152/904; 152/DIG. 3
(58) Field of Search ......................... 152/209.1, 209.18, 152/900, 901, 902, DIG. 3, 904

(56) References Cited

U.S. PATENT DOCUMENTS

5,373,886 A * 12/1994 Yamaguchi et al. ........ 152/526
6,148,886 A * 11/2000 Takasugi et al. ............ 152/904

FOREIGN PATENT DOCUMENTS

| DE | 3901624 | * | 8/1989 | ................. 152/904 |
|----|---------|---|--------|-----|
| EP | 502694  | * | 9/1992 | |
| EP | 0688685 A3 | | 12/1995 | |
| EP | 722851  | * | 7/1996 | |
| EP | 0913274 A1 | | 5/1999 | |
| JP | 3-135749 | * | 6/1991 | |
| JP | 11245621 | | 9/1999 | |

* cited by examiner

Primary Examiner—Steven D. Maki
(74) Attorney, Agent, or Firm—Birch, Stewart, Kolasch & Birch, LLP

(57) ABSTRACT

A vehicle comprises Anti Lock Brake System (ABS) and front tires and rear tires which are capable of displaying maximum braking effect when the ABS is in operation, each of the tires comprises a plurality of tread elements divided by tread grooves, and the tread pattern rigidity Pr of the rear tire is more than the tread pattern rigidity Pf of the front tire, wherein the tread pattern rigidity P (Pr, Pf) is defined as a quotient of the total of circumferential rigidity of all the tread elements existing in a ground contacting region of the tire which is divided by the area of the ground contacting region, and the circumferential rigidity K of each tread element is defined as a quotient of a tangential force F in kgf received at the ground contacting region which is divided by a displacement y in mm at the ground contacting region.

14 Claims, 10 Drawing Sheets

FRONT AND REAR TIRE COMBINATION FOR VEHICLE HAVING ABS AND VEHICLE

The present invention relates to a combination of a front tire and rear tire for a vehicle having ABS and a vehicle including the combination of the tires.

In recent years, the rate of automobiles having Anti Lock Brake System (ABS) is increasing.

In such Anti Lock Brake Systems, as shown in FIG. 14, the slip rate of tires when ABS is operating is usually adjusted in a range of from about 5% to about 10%, and in order to prevent unstable motions such as spin, a difference is provided between the rear wheels and the front wheels such that the slip rate of the rear tires is smaller than that of the front tires.

An object of the present invention is to provide a combination of a front tire and rear tire having different characteristics which can display maximum braking effect when used with the above-mentioned ABS.

Another object of the present invention is to provide a vehicle having such ABS and equipped with the front tires and rear tires which can display maximum braking effect.

According to one aspect of the present invention, a tire combination for a vehicle having an anti lock brake system comprises a front tire and a rear tire, each comprising a plurality of tread elements divided by tread grooves, the rear tire having a tread pattern rigidity Pr and the front tire having a tread pattern rigidity Pf, and the tread pattern rigidity Pr being more than the tread pattern rigidity Pf.

According to another aspect of the present invention, a vehicle comprises an anti lock brake system and the above-mentioned tire combination.

Here, the tread pattern rigidity P (Pr, Pf) is defined as a quotient of the total of circumferential rigidity of all the tread elements existing in a ground contacting region of the tire which is divided by the area of the ground contacting region. The circumferential rigidity K of each tread element 6 is defined as a quotient of a tangential force F in kgf received at the ground contacting region which is divided by a displacement y in mm at the ground contacting region.

$$K = \frac{F}{y}$$

In order to obtain maximum braking effect under the operation of the general ABS, the present inventor studied relationships between frictional coefficient and various factors, and found that it is most important that the tire displays a maximum frictional coefficient under the above-mentioned relatively small slip rate of from 5% to 10%. And as explained above, because a certain difference in slip rate is provided between the front and rear wheels, when the maximum frictional coefficient of the rear tires is less than the maximum frictional coefficient of the front tires, a larger braking force can be obtained.

FIG. 10 shows an exemplary $\mu$-s curve, wherein "$\mu$" on the vertical axis is the frictional coefficient between the tire tread and road surface, and "s" on the horizontal axis is the slip rate therebetween. In this case, a maximum frictional coefficient occurs ideally at a slip rate of about 7%. In general, however, a maximum frictional coefficient occurs at a relatively higher slip rate. For decreasing the slip rate at which the maximum frictional coefficient occurs, it is preferable to increase the rising angle or inclination angle of a substantially straight portion of the $\mu$-s curve rising from the origin of coordinates. Hereinafter, this inclination is called "$\mu$-s stiffness". As a result of inventor's study, it was also found that the $\mu$-s stiffness and the slip rate at the maximum frictional coefficient have a close relationship with a tread pattern rigidity. FIG. 15 shows an exemplary relationship between the pattern rigidity (index) and the slip rate, and an exemplary relationship between the pattern rigidity (index) and the $\mu$-s stiffness (index). As shown in this figure, as the pattern rigidity increases, the $\mu$-s stiffness increases, and the slip rate at the maximum frictional coefficient decreases. This shows that when the tread pattern rigidity of the rear tire is more than the tread pattern rigidity of the front tire, the slip rate at a maximum frictional coefficient becomes smaller on the rear tire than the front tire, which meets the condition of the ABS. Further, when the $\mu$-s stiffness of the rear tire is more than the $\mu$-s stiffness of the front tire, the tread pattern rigidity becomes larger on the rear tire than the front tire. This also meets the condition of the ABS.

Embodiments of the present invention will now be described in detail in conjunction with the accompanying drawings.

FIG. 1 is a schematic perspective view of a vehicle as an embodiment of the present invention.

FIGS. 2 to 5 each show an example of the tread pattern of the pneumatic tire according to the present invention.

Figure 8A:
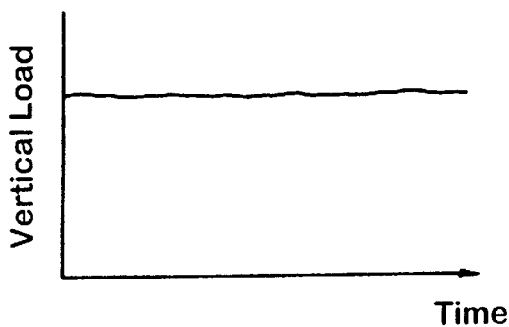
Figure 8B:
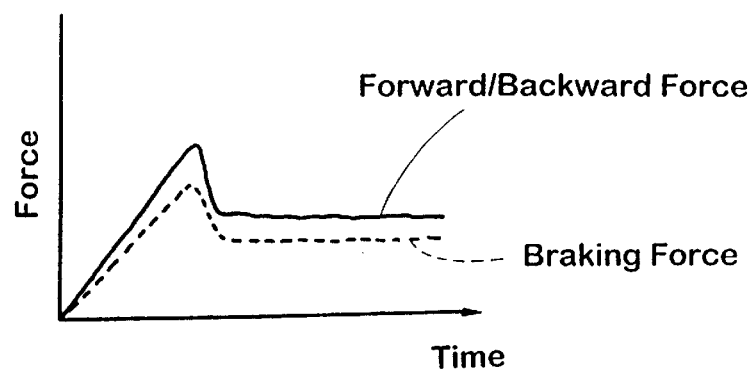
Figure 8C:
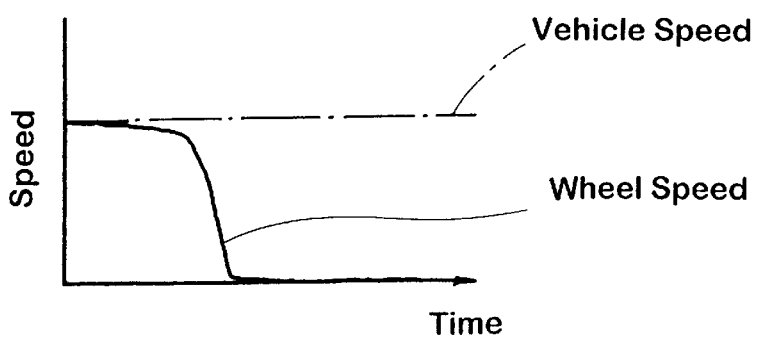

FIGS. 8(A), 8(B) and 8(C) are graphs showing the vertical load, forward and backward force, braking force, test car speed, and wheel speed as a function of the elapsed time which were measured to obtain $\mu$-s curve.

Figure 9:
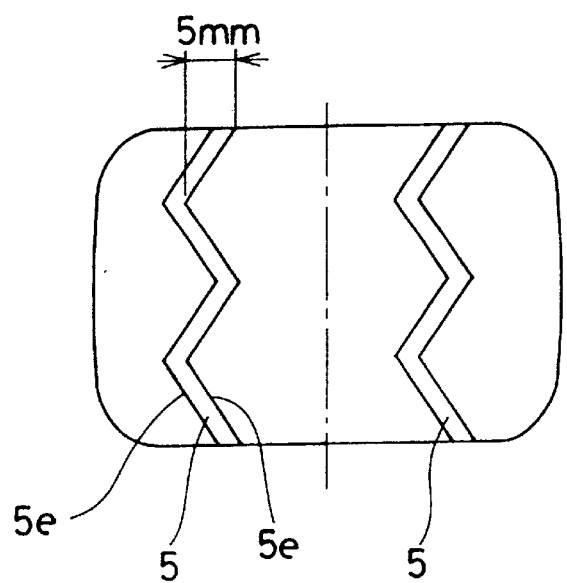

FIG. 9 shows a ground contacting patch for explaining the length of the axial component of the groove edge.

Figure 10:
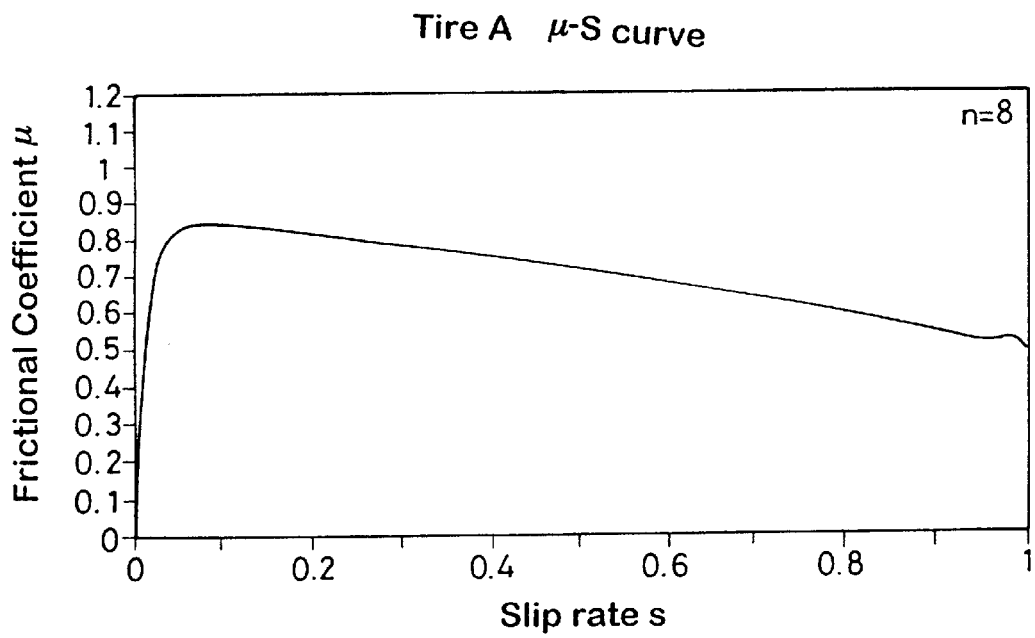

FIG. 10 shows the $\mu$-s curve of test tire A.

Figure 11:
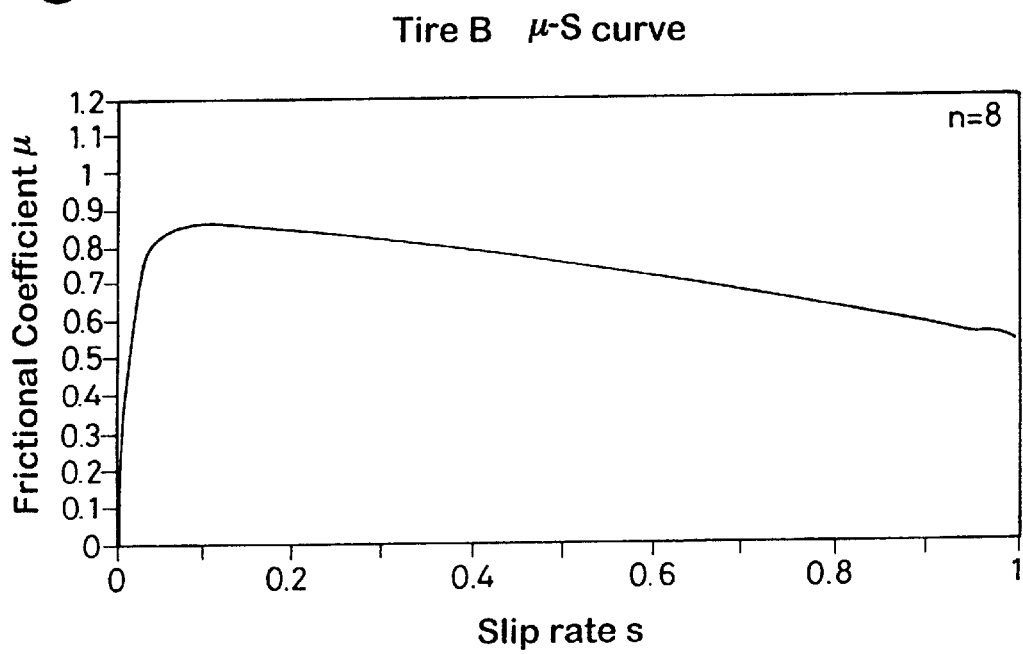

FIG. 11 shows the $\mu$-s curve of test tire B.

Figure 12:
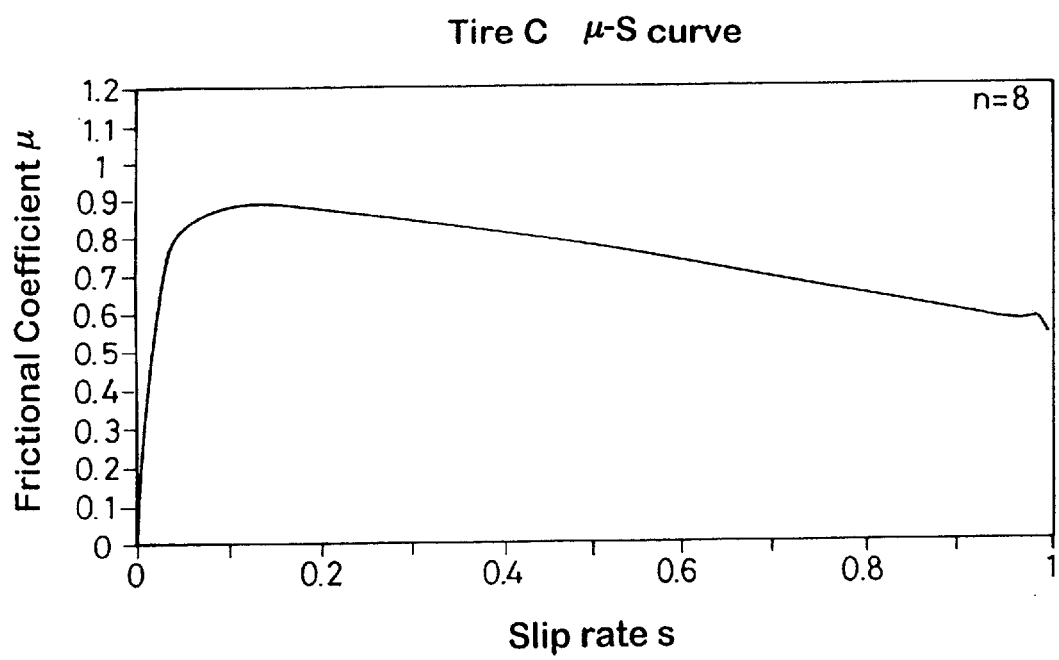

FIG. 12 shows the $\mu$-s curve of test tire C.

Figure 13:
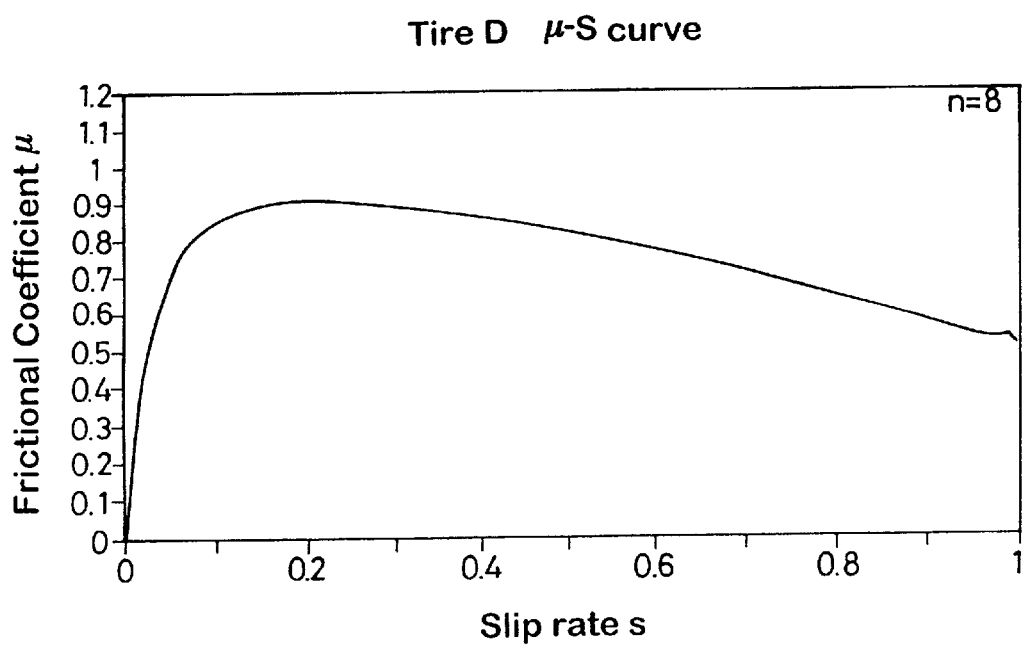

FIG. 13 shows the $\mu$-s curve of test tire D.

Figure 14:
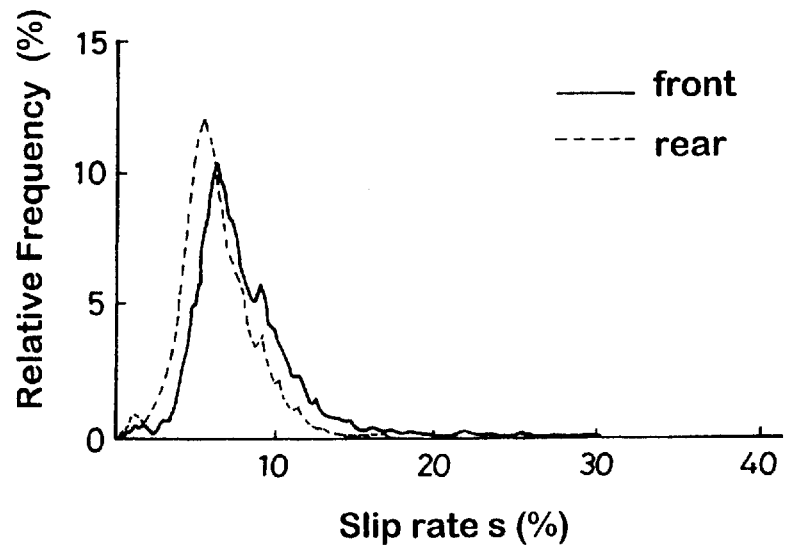

FIG. 14 shows relative frequency of the slip rate of ABSs in operation.

Figure 15:
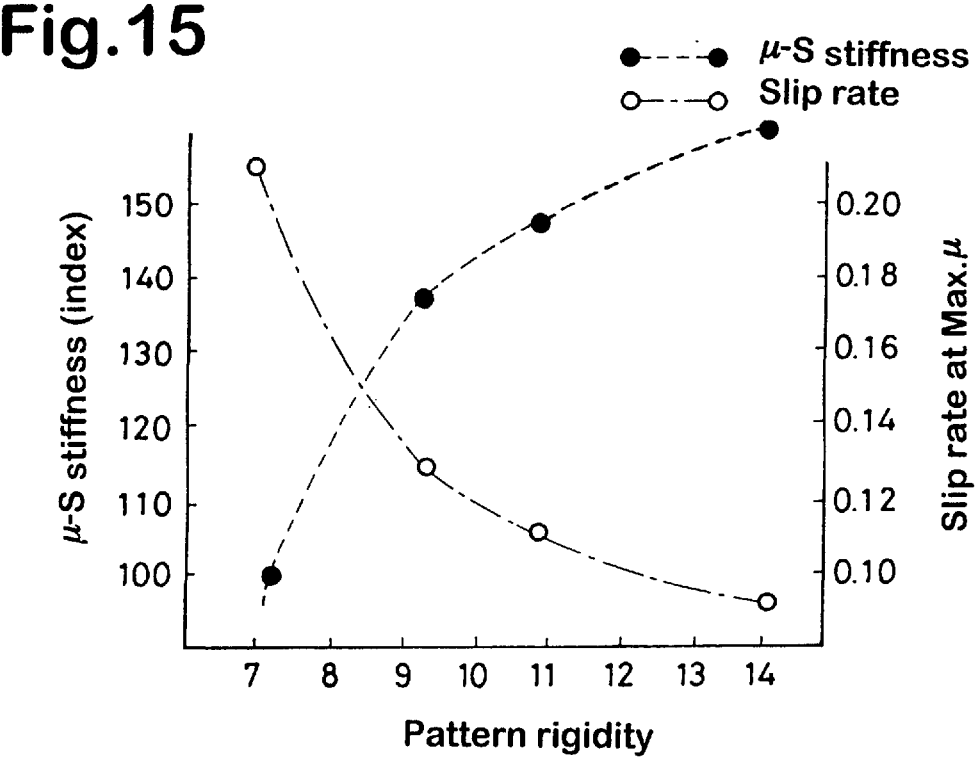

FIG. 15 is a graph showing relationships between the pattern rigidity, $\mu$-s stiffness and slip rate at the maximum frictional coefficient.

Figure 16:
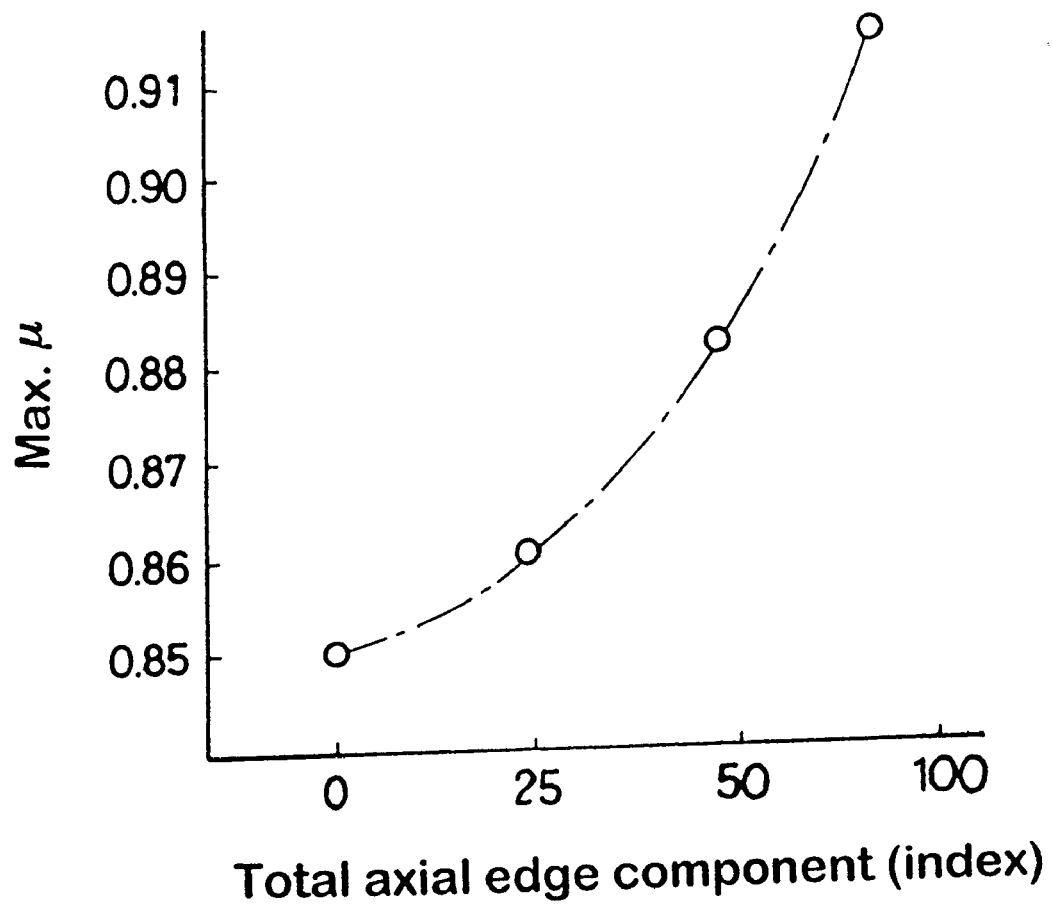

FIG. 16 is a graph showing a relationship between the maximum frictional coefficient and the edge length (index).

Figure 1:
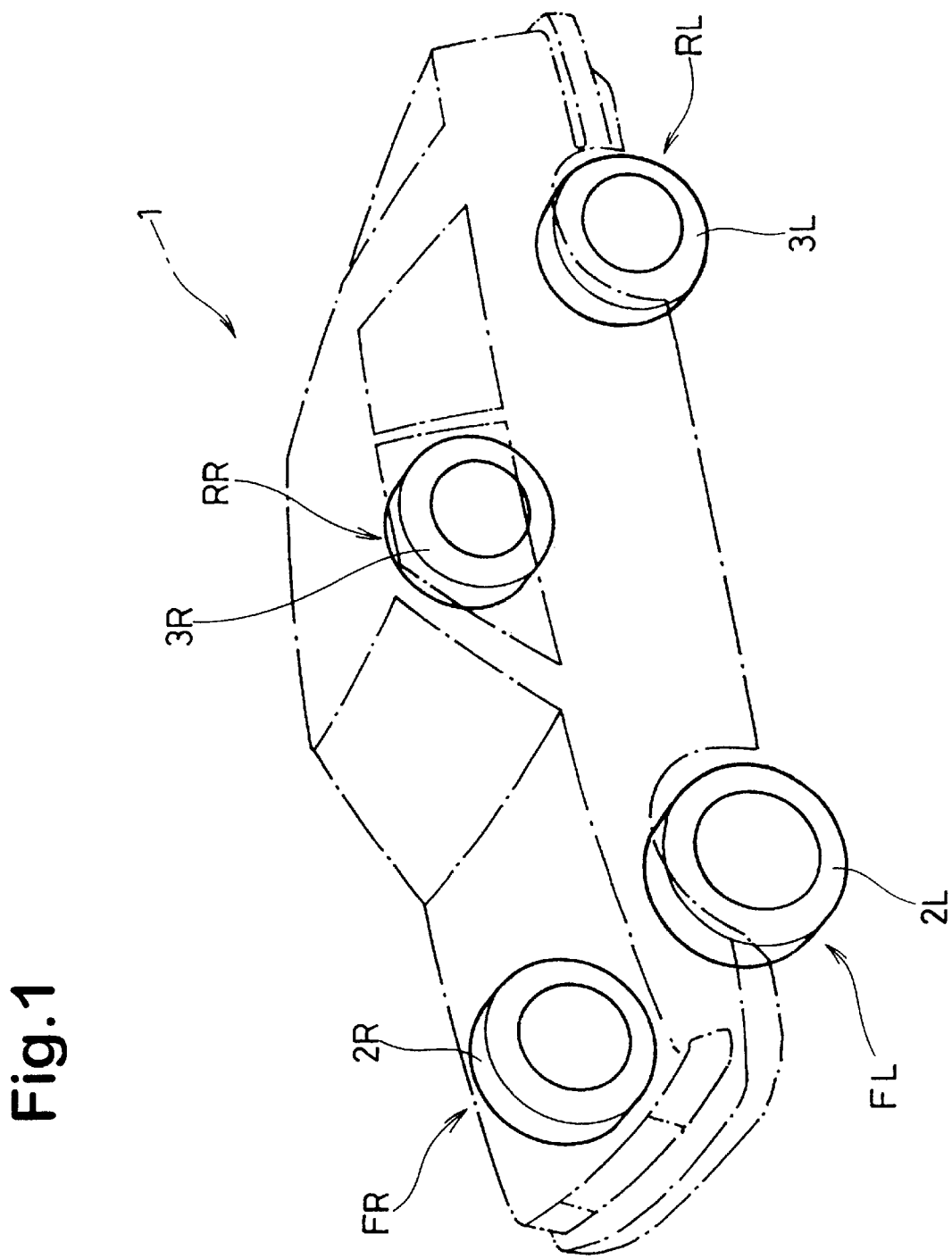

In FIG. 1, a vehicle 1 according to the present invention is an automobile (passenger car) and has an Anti Lock Brake System (ABS). The ABS is adjusted such that, when the ABS is in operation, the slip rate is about 5% to about 10% and the slip rate is lower on the rear wheels RR and RL than the front wheels FR and FL as shown in FIG. 14. On the front wheels FR and FL, pneumatic tires 2R and 2L are mounted, and on the rear wheels RR and RL, pneumatic tires 3R and 3L are mounted.

Figure 3:
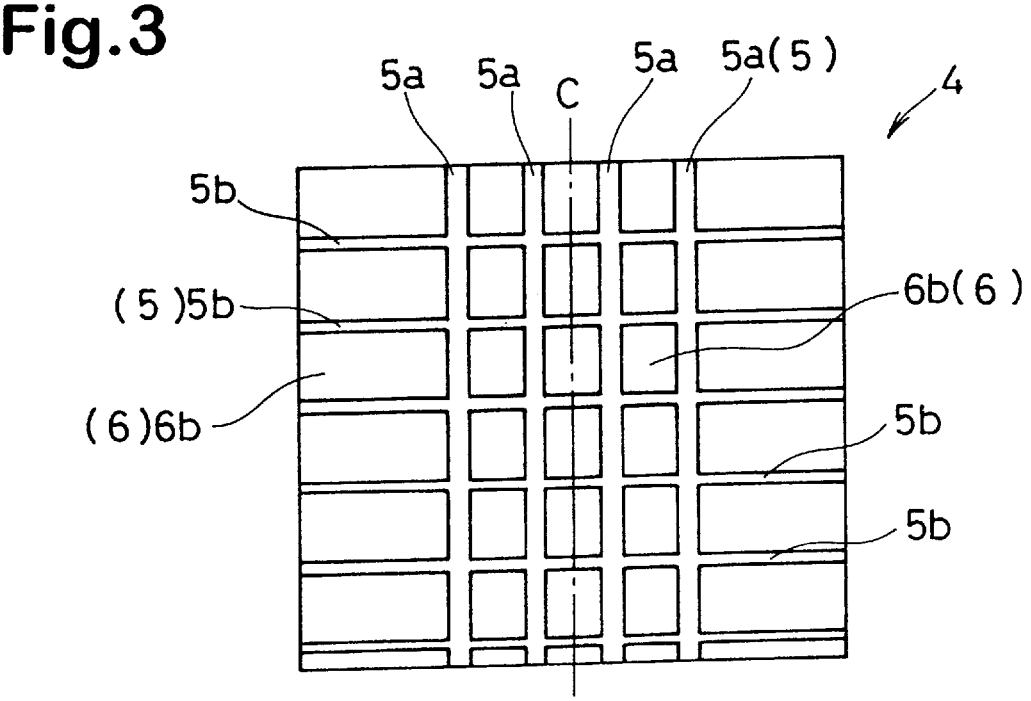
Figure 4:
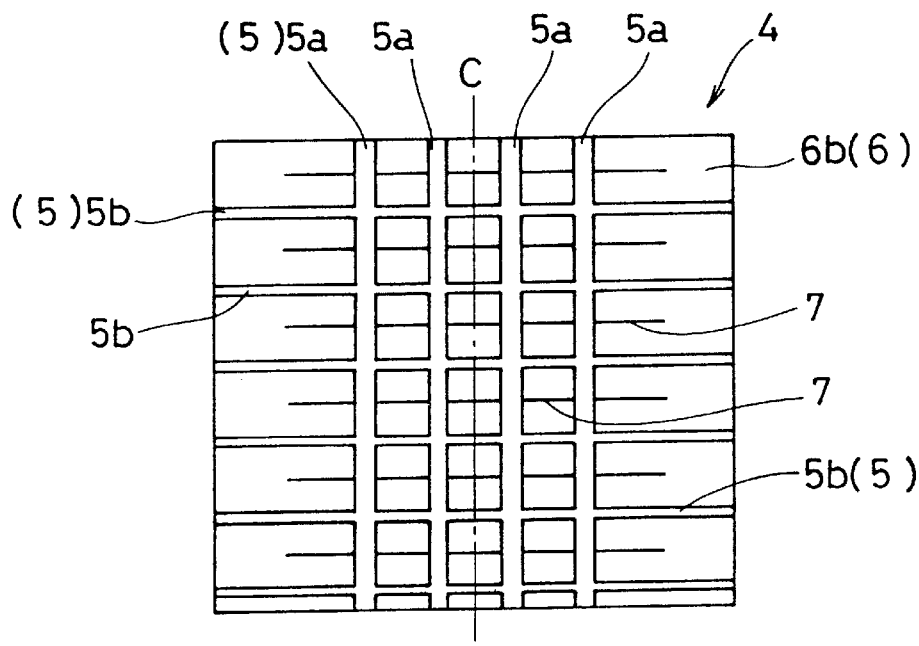
Figure 5:
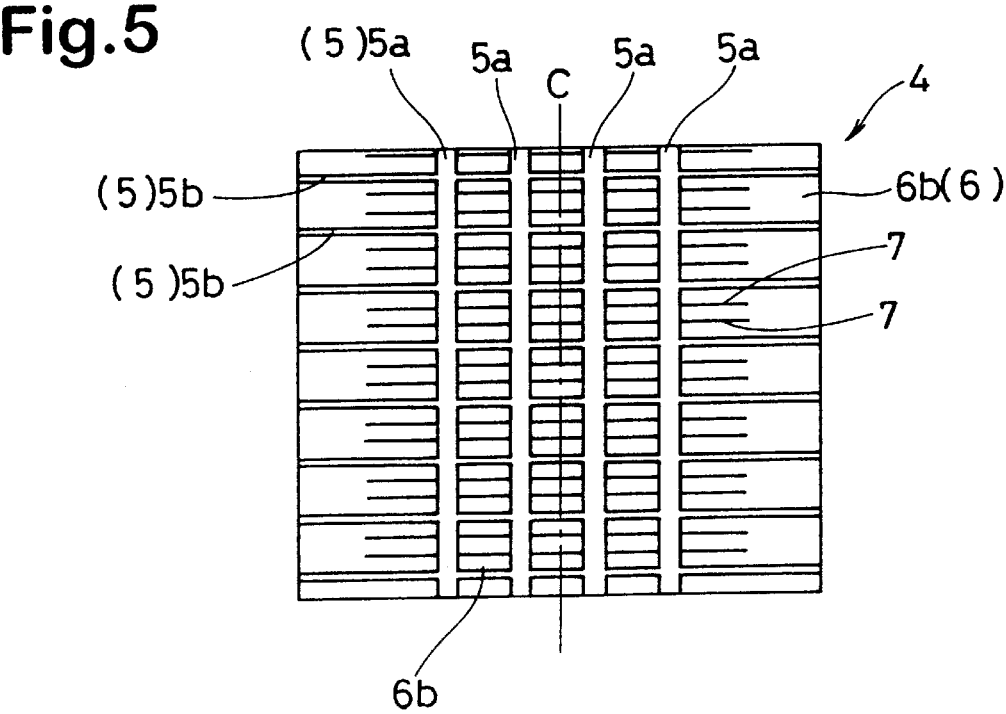

Each of the pneumatic tires 2L, 2R, 3L and 3R comprises a tread portion 4 provided with a plurality of tread elements 6 divided by tread grooves 5. Here, the tread groove 5 is meant as a groove having a certain width enough for water drainage. The tread grooves 5 may include circumferential grooves 5a and axial grooves 5b as shown in FIGS. 2 to 5. As to the configurations of the circumferential grooves 5a and axial grooves 5b, various grooves, e.g. straight grooves, curved grooves, zigzag grooves may be used. The tread elements 6 may include a circumferentially continuous rib such as 6a shown in FIG. 2 and/or circumferentially discontinuous blocks such as 6b shown in FIGS. 3 to 5. Thus, the tread pattern in this invention includes so called "rib pattern", "block pattern", "rib-and-block pattern", "rib-and-rug pattern", "rug pattern" and the like. The tread patterns can be symmetrical about the tire equator C as shown in FIGS. 2 to 5, but it is also possible to make the tread patterns not symmetrical. Further, it is also possible to make the tread pattern bidirectional or unidirectional. Furthermore, as shown in FIGS. 4 and 5, it is possible that the tread elements 6s are provided with sipes 7 having no substantial width (for example under 1.0 mm).

Figure 2:
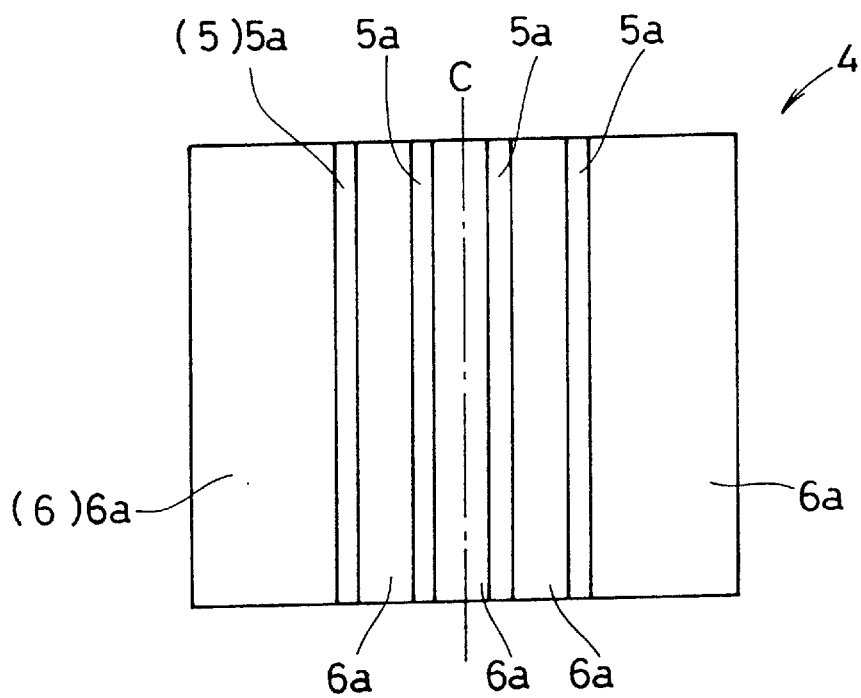

FIG. 2 shows an example of the tread pattern comprising four straight circumferential grooves 5a. FIG. 3 shows an example of the tread pattern comprising four straight circumferential grooves 5a and axial grooves 5b extending straight from one tread edge to the other tread edge in parallel with the tire axial direction. FIG. 4 shows an example of the tread pattern which is similar to FIG. 3, but sipes 7 extending straight from one tread edge to the other tread edge in parallel with the tire axial direction are disposed alternately with the axial grooves 5b. FIG. 5 shows an example of the tread pattern which is similar to FIG. 4, but the number of sipes 7 are doubled. Therefore, in the example shown in FIG. 2, all the tread elements 6 are a circumferentially continuous rib. Thus, the pattern is a rib pattern. In the examples shown in FIGS. 3–5, all the tread elements 6 are a rectangular block. Thus, the patterns are block patters. The difference between the pattern in FIG. 2 and that in FIG. 3 is the number of axial grooves 5b. The difference between the patterns in FIGS. 3–5 is the number of sipes 7.

The tread pattern rigidity Pr of each rear tire 3L and 3R is set to be more than the tread pattern rigidity Pf of each front tire 2L and 2R. Preferably, the tread pattern rigidity Pr is more than 1.1 times, more preferably more than 1.25 times, still more preferably more 1.50 times the pattern rigidity Pf. It is also preferable that the pattern rigidity P (Pf, Pr) is set in the range of from 70 to 200 kgf/mm cm² to achieve both the steering stability and wet performance.

Here, the tread pattern rigidity P (Pr, Pf) is defined as a quotient of the total of circumferential rigidity of all the tread elements 6 existing partially or wholly in the ground contacting region around the tire which is divided by the area in cm² of this ground contacting region.

The ground contacting region is defined as a region between the tread edges E. The tread edges E are the axially outmost edges (e) of a ground contacting area 9 of the tread portion 4 under a standard loaded condition in which the tire is mounted on a standard rim and inflated to a standard inner pressure and loaded with a standard load. The standard rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at Various Cold Inflation Pressures" table in TRA or the like. The standard load is the "maximum load capacity" in JATMA, the "Load Capacity" in ETRTO, the maximum value given in the above-mentioned table in TRA or the like.

The circumferential rigidity K of a tread element 6 is defined by the following equation $$K = \frac{F}{y}$$

wherein

F=tangential force in kgf received at the ground contacting region y=displacement in mm at the ground contacting region. (shown in FIG. 6(A))

Figure 6A:
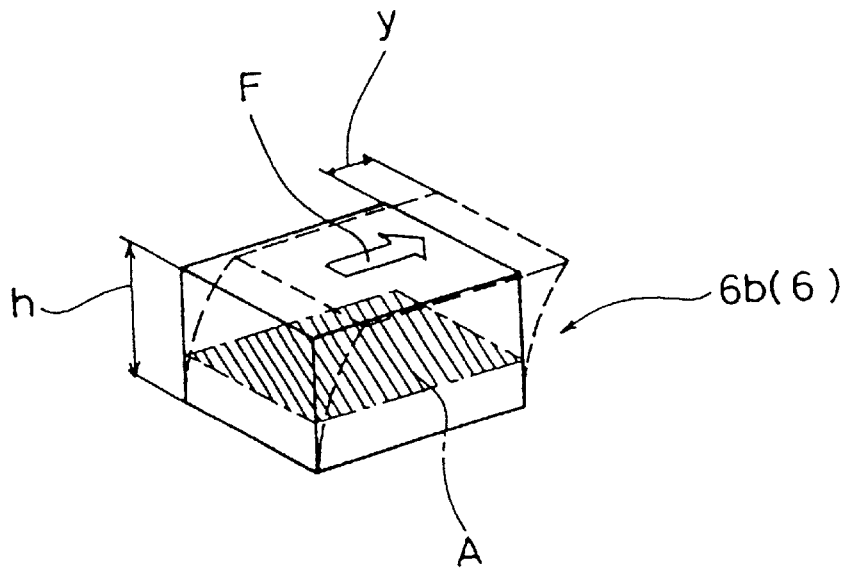
FIG. 6(A) is a perspective view of a tread element for explaining the rigidity thereof.

On the basis that a tread element 6 is regarded as a cantilever beam fixed at its radially inner end as shown in FIG. 6(A), the circumferential rigidity K (kgf/mm) of the tread element 6 can be obtained by the following equation.

$$K = \frac{1}{\left(\frac{h^3}{3 \cdot E \cdot I} + \frac{h}{A \cdot G}\right)}$$

wherein h=height in mm of the tread element

E=Youngs modulus in kgf/mm² of the tread rubber

I=Second moment of area in mm⁴ of the tread element

A=sectional area in mm² of the tread element

G=Shearing stiffness in kgf/mm² of the tread rubber (=E/3).

When the tread element 6 is a circumferentially continuous rib 6a as shown in FIG. 2, the circumferential rigidity K is calculated on the assumption that the tread element 6 is a block having a height equal to 50% of the actual height (h) and a circumferential length equal to that of a portion of the rib actually contacting with the ground under the standard loaded condition.

Figure 7:
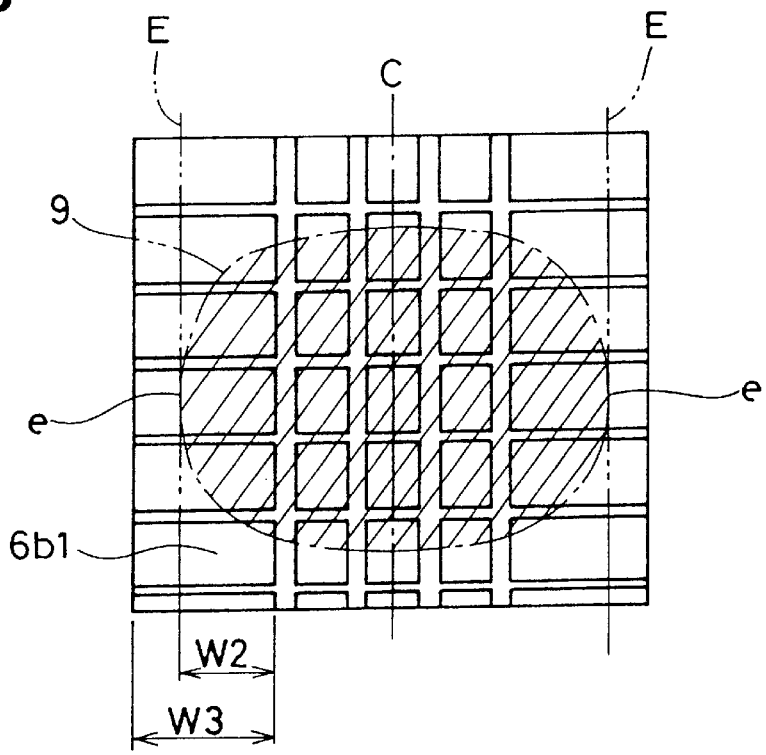
FIG. 7 shows a ground contacting patch (shaded area) in the tread pattern shown in FIG. 2.

When the tread element 6 protrudes partially from the tread edge E as shown in FIG. 7 as the blocks 6b1 for example, the width W2 to the tread edge E is used instead of the actual block width W3.

If it is difficult to use the equation 1 because the element has a complex shape, the rigidity may be obtained by applying a quadrature and/or coordinate conversion.

In this embodiment, the front tires 2 have a μ-s stiffness αf, and the rear tires 3 have a μ-s stiffness αr which is larger than μ-s stiffness αf.

The μ-s stiffness α (αr, αf) is, as explained above, the inclination angle of a substantially straight portion of a μ-s curve of the tire which rises from the origin of rectangular coordinates, wherein the horizontal axis is the slip rate (s) and the vertical axis is the frictional coefficient μ.

The rear tire's μ-s stiffness αr is preferably more than 1.1 times, more preferably more than 1.15 times, still more preferably more than 1.30 times the front tire's μ-s stiffness αf.

In this application, the μ-s curve is obtained as follows: the test tire is mounted on a standard rim and inflated to a standard inner pressure; the tire and rim assembly is mount on a trailer which is attached to a motorcar; during running straight at a constant speed of 64 km/hr on a wet asphalt road covered with a 1–2 mm thickness water film, a controlled brake is applied to the test tire such that the time from a free state to wheel-locked state becomes one second; and at regular intervals of four seconds, the vertical load (FIG. 8(A)), forward-and-backward force and braking force (FIG. 8(B)) are measured on the tire axle, and the running speed and wheel speed (FIG. 8(C)) are measured. From the measured data, the frictional coefficient μ is computed as follows.

μ=forward-and-backward force/vertical load

The slip rate (s) between the tire and road is $$s = 1 - \left(\frac{Vt}{Vc}\right)$$

wherein

Vt=wheel speed

Vc=vehicle running speed.

The μ-s curve is obtained by plotting data of the slip rate (s) and frictional coefficient μ computed as above.

Figure 6B:
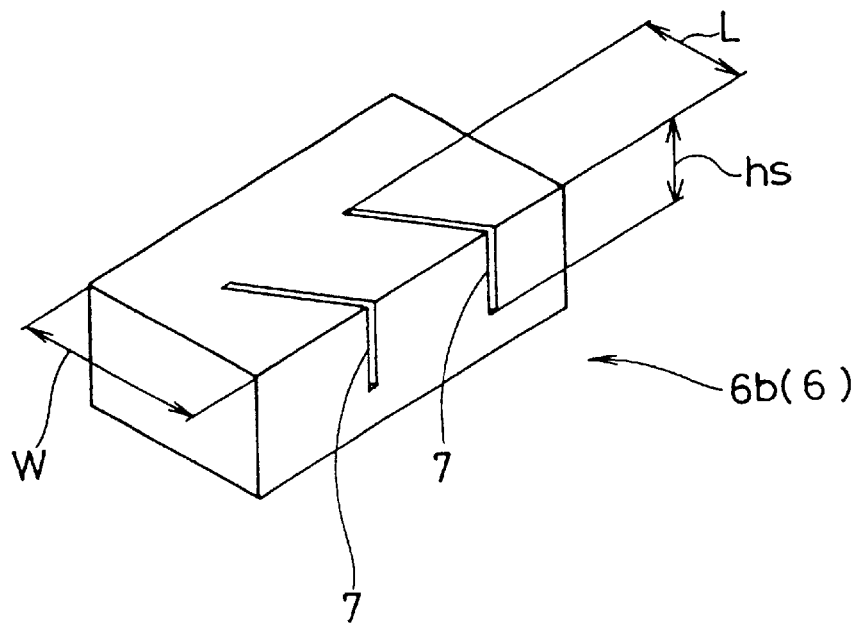
FIG. 6(B) is a perspective view of a tread element with sipes.

In this invention, it is possible to provide sipes 7 in order to improve braking performance under wet conditions. When the tread element 6 is provided with sipe(s) as shown in FIG. 6(B), the value K should be rectified by the following equation because the actual circumferential rigidity K' of the tread element 6 is decreased from the above-mentioned computed value K.

$$K' = K \times \left\{ 1 - \frac{L}{W}\left(0.233 \times \frac{hs}{h} - 0.048\right) \right\}^n$$

wherein
  W=Width in mm of the tread element
  L=Length in mm of axial component of the sipe(s)
  hs=Depth in mm of the sipe(s)
  n=Number of sipe(s).
This equation was empirically formulated.

If the sipes 7 are formed too much, the above-mentioned $\mu$-s stiffness becomes insufficient. Thus, the number of sipes per one block is preferably one to three.

In this embodiment, further, the total axial edge length Sf of the front tire 2 is set to be more than the total axial edge length Sr of the rear tire 3.

The total axial edge length S (Sf, Sr) is the total length in mm of axial component of groove edges exist in the ground contacting region under the above-mentioned standard loaded condition. The groove edges include edges of the sipes 7 as well as edges of the tread grooves 5 such as circumferential grooves 5a and axial grooves 5b and the like. In case of a tread groove 5 having a certain width, two edges one on each side thereof are counted. However, in case of a sipe having no substantial width, two edges should be regard as one edge. For example, in a tread pattern shown in FIG. 9, a right edge 5e and a left edge 5e of each of two zigzag grooves 5 are counted. If only the ground contacting patch shown in this figure is considered and the zigzag amplitude is supposed to be 5 mm, the axial edge component per one zigzag groove is 5×4×2=40 mm. Thus, the total axial edge length is 40×2=80 mm. Preferably, the total axial edge length Sf of the front tire is more than 1.5 times, more preferably more than 1.8 times, still more preferably more than 2.0 times the total axial edge length Sr of the rear tire.

As to the internal structures of the front and rear tires 2 and 3, it is not always necessary to limit to a specific structure, but a belted radial tire having a radial ply carcass and a stiff belt may be suitably employed.

Comparative Test

Table 1 shows the results of a comparison test conducted using two types of 1500 cc FF-type Japanese passenger cars (A and B) equipped with ABS. In the test, the test car was run on a wet asphalt road and sharply braked at a speed of 100 km/hr so that the ABS worked. Such sharp braking was repeated five times to obtain the average braking distance. The specifications of the test tires A, B, C and D used are shown in Table 2.

TABLE 1

|  | Ref. 1 | Ref. 2 | Ex. 1 | Ref. 3 | Ex. 2 | Ex. 3 | Ref. 4 | Ex. 4 | Ex. 5 |
|---|---|---|---|---|---|---|---|---|---|
| Front tire | A | B | B | C | C | C | D | D | D |
| Pattern rigidity Pf | 195 | 152 | 152 | 128 | 128 | 128 | 100 | 100 | 100 |
| $\mu$-s stiffness $\alpha f$ | 159 | 146 | 146 | 138 | 138 | 138 | 100 | 100 | 100 |
| Total axial edge length Sf | 0 | 25 | 25 | 50 | 50 | 50 | 100 | 100 | 100 |
| Rear tire | A | B | A | C | B | A | D | C | B |
| Pattern rigidity Pr | 195 | 152 | 195 | 128 | 152 | 195 | 100 | 128 | 152 |
| $\mu$-s stiffness $\alpha r$ | 159 | 146 | 159 | 138 | 146 | 159 | 100 | 138 | 146 |
| Total axial edge length Sr | 0 | 25 | 0 | 50 | 25 | 0 | 100 | 50 | 25 |
| Pr/Pf | 1 | 1 | 1.28 | 1 | 1.18 | 1.51 | 1 | 1.29 | 1.52 |
| $\alpha r/\alpha f$ | 1 | 1 | 1.09 | 1 | 1.06 | 1.15 | 1 | 1.38 | 1.46 |
| Sf/Sr | 1 | 1 | — | 1 | 2 | — | 1 | 2 | 4 |
| Brakeing distance (m) |  |  |  |  |  |  |  |  |  |
| test car A | 57.3 | 53.1 | 52.2 | 51.3 | 51.1 | 49.8 | 50.7 | 48 | 47.4 |
| test car B | 52.4 | 51.8 | 51.2 | 52.6 | 52.2 | 50.9 | 55.2 | 53 | 52.6 |

When the braking distance of Ex.1 is compared with that of Ref.2, those of the test car A and test car B were shortened 0.9 m and 0.7 m, respectively. When the braking distance of Ex.3 is compared with that of Ref.3, the braking distances of the test car A and test car B were shortened 1.5 m and 1.7 m, respectively. When the braking distance of Ex.5 is compared with that of Ref.4, those of the test car A and test car B were shortened 3.3 m and 2.6 m, respectively.

TABLE 2

| Tire | A | B | C | D |
|---|---|---|---|---|
| Tread pattern | FIG. 2 | FIG. 3 | FIG. 4 | FIG. 5 |
| Tread groove depth (mm) | 8.2 | 8.2 | 8.2 | 8.2 |
| Positive ratio (%) | 77 | 70 | 70 | 70 |
| Number of sipe per tread element | 0 | 0 | 1 | 2 |
| Sipe depth (mm) | — | — | 8.2 | 8.2 |
| Pitch number | — | 60 | 60 | 80 |
| $\mu$-s curve | FIG. 10 | FIG. 11 | FIG. 12 | FIG. 13 |
| Max. frictional coefficient | 0.845 | 0.858 | 0.884 | 0.908 |
| Slip rate at max. frictional coefficient | 0.09 | 0.11 | 0.13 | 0.21 |
| Pattern rigidity P |  |  |  |  |
| (N/mm cm$^2$) | 14.07 | 10.96 | 9.27 | 7.22 |
| (index) | 195 | 152 | 128 | 100 |
| $\mu$-s stiffness $\alpha$ | 30.47 | 28.04 | 26.61 | 19.21 |
| (index) | 159 | 146 | 138 | 100 |
| Total edge component (index) | 0 | 25 | 50 | 100 |
| Tire lateral rigidity (kgf/mm) | 11.97 | 10.82 | 10.74 | 10.54 |

Tire size: 195/60R14
Inner pressure: 200 kPa
In the tread patterns shown in FIGS. 3–5, the pitch number corresponds to the number of axial grooves.
The measuring conditions for $\mu$-s curves shown in FIGS. 10 to 13 were as follows:
  Tire vertical load: 4.75 kN
  Running speed: 64 km/h
  Tire inner pressure: 200 kPa
  Road surface: wet asphalt with 1 to 2 mm depth water pool
What is claimed is:
1. A combination of front tires and rear tires for a vehicle, each of the tires comprising a plurality of tread elements divided by tread grooves, the rear tires each having a tread pattern rigidity Pr, the front tires each having a tread pattern rigidity Pf, the tread pattern rigidity Pr being more than 1.1 times the tread pattern rigidity Pf, wherein the tread pattern rigidity P (Pr, Pf) is defined as a quotient of the total of circumferential rigidity of all the tread elements existing in a ground contacting region of the tire which is divided by the area of the ground contacting region, and the circumferential rigidity K of each tread element is defined as a quotient of a tangential force F in kgf received at the ground contacting region which is divided by a displacement y in mm at the ground contacting region, and the tread pattern of the front tires and the tread pattern of the rear tires being the substantially same block patterns excepting that the number of sipes in each of the front tires is larger than the number of sipes in each of the rear tires.

2. The combination according to claim 1, wherein the front tires have a $\mu$-s stiffness $\alpha f$ and the rear tires have a $\mu$-s stiffness $\alpha r$, and the $\mu$-s stiffness $\alpha r$ is larger than the $\mu$-s stiffness $\alpha f$.

3. The combination of the front and rear tires for a vehicle according to claim 2, wherein the $\mu$-s stiffness $\alpha r$ of the rear tires is more than 1.1 times the $\mu$-s stiffness $\alpha f$ of the front tires.

4. The combination according to claim 1, wherein the block pattern comprises rectangular blocks.

5. The combination of front and rear tires for a vehicle according to claim 1, wherein the tread pattern rigidity Pr of the rear tires is more than 1.25 times the tread pattern rigidity Pf of the front tires.

6. The combination of front and rear tires for a vehicle according to claim 1, wherein the tread pattern rigidity Pr of the rear tires is more than 1.50 times the tread pattern rigidity Pf of the front tires.

7. A vehicle comprising front tires and rear tires, an anti-lock brake system for controlling slip rates of the front tires and rear tires so that said slip rates are within a range of from 5% to 10% and the slip rate of the rear tires is smaller than the slip rate of the front tires, each of the tires having a tread pattern comprising a plurality of tread elements divided by tread grooves, and having a tread pattern rigidity P of from 70–200 kgf/mm sq. cm, the rear tires each having a tread pattern rigidity Pr, the front tires each having a tread pattern rigidity Pf, and the tread pattern rigidity Pr being more than 1.1 times the tread pattern rigidity Pf, wherein the tread pattern rigidity P (Pr, Pf) is defined as a quotient of the total of circumferential rigidity of all the tread elements existing in a ground contacting region of the tire which is divided by the area of the ground contacting region, and the circumferential rigidity K of each tread element is defined as a quotient of a tangential force F in kgf received at the ground contacting region which is divided by a displacement y in mm at the ground contacting region, the tread pattern of the front tire being the substantially same as the tread pattern of the rear tire except that the number of sipes in the front tire is larger than the number of sipes in the rear tire, and wherein the tread pattern of the front tire and the tread pattern of the rear tire are block patterns.

8. The vehicle according to claim 1, wherein the front tires have a $\mu$-s stiffness $\alpha f$ and the rear tires have a $\mu$-s stiffness $\alpha r$, and the $\mu$-s stiffness $\alpha r$ is larger than the $\mu$-s stiffness $\alpha f$.

9. The vehicle according to claim 8, wherein the $\mu$-s stiffness $\alpha r$ of the rear tires is more than 1.1 times the $\mu$-s stiffness $\alpha f$ of the front tires.

10. The vehicle according to claim 1, wherein each of the rear tires has no sipe and each of the front tires has sipes.

11. The vehicle according to claim 1, wherein the block pattern comprises rectangular blocks.

12. The vehicle according to claim 1, wherein the tread pattern rigidity Pr of the rear tires is more than 1.25 times the tread pattern rigidity Pf of the front tires.

13. The vehicle according to claim 1, wherein the tread pattern rigidity Pr of the rear tires is more than 1.50 times the tread pattern rigidity Pf of the front tires.

14. The vehicle according to claim 1, wherein the front tires are substantially the same as the rear tires in tire size.

* * * * *